: 3,517,432
Patented June 30, 1970

3,517,432
DIFFUSION BONDING OF CERAMICS
Donald J. Sandstrom, Los Alamos, N. Mex., assignor to the United States of America as represented by the United States Atomic Energy Commission
Filed May 2, 1968, Ser. No. 726,244
Int. Cl. B23k 31/02
U.S. Cl. 29—472.7     5 Claims

ABSTRACT OF THE DISCLOSURE

A method of bonding a ceramic to another ceramic body in which a metal such as aluminum, titanium, or vanadium in the form of foil, oxide, or hydride is placed between two ceramic bodies, heated in an oxidizing or inert atmosphere until the metal reacts with the ceramic causing solution of the bonding agent with the ceramic. Upon subsequent cooling to room temperature the bonding material remains as a mixed oxide phase which is a nonconducting ceramic phase which has produced a diffusion bond.

---

The invention described herein was made in the course of, or under, a contract with the United States Atomic Energy Commision.

This invention pertains to the bonding art, and particularly to the bonding of two ceramic pieces by means of a diffusion bond. In particular, ceramic members of alumina, magnesia, zirconia, etc. are joined together by placing a suitable reactive metal foil or powdered hydride or oxide between the two ceramic pieces and heating this assembly in an oxidizing or suitable inert atmosphere to a temperature which allows the said metal foil or powder to melt and dissolve some of the parent ceramic in this melt.

The prior art as taught by U.S. Pat. Nos. 2,979,813; 2,667,431; 2,570,248; 3,065,533; and 2,996,401 discloses various methods of joining ceramic to ceramic; however, all of these bonds either involve a mechanical bond or rely on some additional material besides the reactive metal of this invention to form the chemical bond. In particular, U.S. Pat. No. 2,979,813 teaches the joining of graphite members by placing a carbide-forming metal such as titanium or zirconium between the members to be joined and subjecting the region to a temperature between 1750–2500° C. to form a carbide, maintaining the said region at said temperature for a time sufficient to permit volatilization of a portion of said carbide-forming metal, and cooling said region, whereby graphite precipitates to form a substantial portion of the material joining said members. The method of this invention does not involve the mechanism of carbide-forming, and in this respect it would not appear obvious to employ the same process in joining ceramic members together.

U.S. Pat. No. 2,667,431 discloses that metals such as titanium, zirconium, titanium-coopper alloys, etc., have been bonded to ceramics by bringing the ceramic and metal or alloy into contact and subjecting the contact surface to frictional movement, causing a film of the metal or alloy to be deposited on the ceramic surface. It is apparent from this patent that the mechanism disclosed therein is of a mechanical nature as contrasted to the chemical bond of this invention.

U.S. Pat. No. 2,570,245 teaches a method of joining non-metallic refractory bodies such as graphite and various ceramics. This method includes using a mixture of titanium hydride, etc., and a solder metal which is placed between the pieces to be joined. The pieces are heated to a temperature above 400° C. to dissociate the hydride and melt the solder in an inert atmosphere. The cooling of the pieces results in the formation of a chemical bond between the refractory bodies and an electrically conductive joint. The process of this invention is directed to using a reactive metal such as titanium or zirconium but without the addition of a solder.

U.S. Pat. No. 3,065,533 is concerned with the joining of a ceramic to metal; however, it would be equally adaptable to the joining of ceramic pieces. The process comprises inserting a shim of titanium between the members to be joined, placing a solder member in contact with the edge of the titanium shim, heating the assembly in an oxygen-free atmosphere to a temperature which melts the solder member and wets the shim by capillary action, thus causing a partial solution of the shim, and cooling the assembly to form a bond between the two members being joined. In this process it should be noted that the titanium shim is not what forms the bond but rather the titanium solder alloy.

U.S. Pat. No. 2,996,401 teaches a method of metallizing ceramics and specifically alumina. A metal powder mixture of 1–25 percent by weight titanium is placed on the surface to be metallized and fired in a reducing atmosphere at a temperature at least as high as the sintering temperature of the mixture. This reference further teaches the chemical action of titanium and alumina, with the result that the titanium is oxidized by the alumina. The 1–25 percent by weight titanium range is preferred because of the amount of interaction between the titanium and the ceramic.

The method of this invention is useful in joining not only alumina but other ceramics such as magnesia and zirconia, said ceramics having utility as containers in the liquid plutonium refining art and also in the plasma thermocouple art. This invention is directed to a diffusion bonding method whereby the ceramic is joined to another ceramic member by using a metal in the form of foil or the powdered hydride or oxide such as titanium, aluminum, or vanadium which is reactive with the ceramic to the extent that some of the ceramic will dissolve in the metal melt. When cooled, this joint consists of a solid crystal of the mixed phase ceramic and precipitates as such across the joint interface. The advantage of the present invention over the prior art as set forth above is that the joint will withstand extremely high temperatures since it consists essentially of the ceramic itself being the joining material. The metal used is, in a sense, just a medium to cause the said ceramic to be dissolved at the interface and allow it to be precipitated across the joint interface leaving essentially a solid ceramic.

It is therefore an object of this invention to provide an improved method of joining a ceramic to another ceramic body, said joint being able to withstand temperatures near the melting point of said ceramic.

Other objects and advantages of this invention will become apparent from the following description of the preferred embodiment.

Titanium, or other suitable reactive metal, is used as a diffusion promoting member between two pieces of $Al_2O_3$ ceramic. The sandwiched assembly is heated in an oxidizing or suitable inert atmosphere until the metal melts and dissolves some of the ceramic in the melt. This causes the equilibrium to shift and precipitates Al$_2$O$_3$ and titanium oxide as a solid crystal across the joint interface.

While the particular embodiment of the invention has been shown and described, it will be obvious to those skilled in the art that various changes and modifications may be made without departing from the invention in its broader aspects, and in particular, any metal such as aluminum or vanadium may be used which is reactive with the selected ceramic to the extent that the metal melts and dissolves a portion of the ceramic. Therefore, the appended claims are intended to cover all such changes and modifications as fall within the true scope of the invention.

What I claim is:

1. A method of diffusion bonding ceramic to ceramic comprising placing a metal selected from the class consisting of aluminum, titanium, and vanadium between the two ceramic members, heating in an oxidizing or inert atmosphere until the metal melts and dissolves some of the ceramic in the melt, and then cooling to room temperature.

2. The method of claim 1 is which said metal is in the form of a foil, oxide, or hydride.

3. The method of claim 1 in which said metal is aluminum.

4. The method of claim 1 in which said metal is titanium.

5. The method of claim 1 in which said metal is vanadium.

References Cited

UNITED STATES PATENTS

| | | | |
|---|---|---|---|
| 2,686,958 | 8/1954 | Eber et al. | 29—473.1 |
| 2,848,801 | 8/1958 | Eber | 29—472.9 |
| 2,979,814 | 4/1961 | Steinberg | 29—472.9 X |
| 2,996,401 | 8/1961 | Welch et al. | 29—473.1 X |
| 3,065,533 | 11/1962 | Dungan et al. | 29—472.7 |
| 3,110,571 | 11/1963 | Alexander et al. | 29—473.1 X |
| 3,131,460 | 5/1964 | Allen | 29—472.7 X |
| 3,425,116 | 2/1969 | Crooks et al. | 29—472.7 |
| 3,442,006 | 5/1969 | Guichet et al. | 29—473.1 X |
| 3,468,647 | 9/1969 | Buyers et al. | 29—472.9 X |

JOHN F. CAMPBELL, Primary Examiner

R. J. SHORE, Assistant Examiner

U.S. Cl. X.R.

29—472.9, 473.1